(12) United States Patent
Choi et al.

(10) Patent No.: US 9,544,544 B2
(45) Date of Patent: Jan. 10, 2017

(54) METHOD AND SYSTEM FOR SHARING INFORMATION BETWEEN USERS IN MEDIA REPRODUCING SYSTEM

(75) Inventors: Hyun-seok Choi, Seoul (KR); Ji-seon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 520 days.

(21) Appl. No.: 12/246,787

(22) Filed: Oct. 7, 2008

(65) Prior Publication Data

US 2009/0193463 A1    Jul. 30, 2009

(30) Foreign Application Priority Data

Jan. 29, 2008  (KR) ........................ 10-2008-0009003

(51) Int. Cl.
| | |
|---|---|
| *H04N 21/4788* | (2011.01) |
| *H04N 7/173* | (2011.01) |
| *H04N 21/658* | (2011.01) |
| *H04N 21/8549* | (2011.01) |
| *H04L 29/06* | (2006.01) |

(52) U.S. Cl.
CPC ............ *H04N 7/173* (2013.01); *H04L 65/605* (2013.01); *H04N 21/4788* (2013.01); *H04N 21/6582* (2013.01); *H04N 21/8549* (2013.01)

(58) Field of Classification Search
USPC ....................................................... 725/121
See application file for complete search history.

(56) References Cited

U.S. PATENT DOCUMENTS

| | | | | |
|---|---|---|---|---|
| 5,719,872 A | * | 2/1998 | Dubberly et al. ............. | 370/487 |
| 6,988,248 B1 | * | 1/2006 | Tang ..................... | G06F 3/0481 |
| | | | | 345/473 |

(Continued)

FOREIGN PATENT DOCUMENTS

| | | |
|---|---|---|
| KR | 10-2004-0099734 A | 12/2004 |
| KR | 10-2007-0065608 | 6/2007 |

(Continued)

OTHER PUBLICATIONS

Korean Office Action issued May 25, 2012 in corresponding Korean Patent Application 10-2008-0009003.

(Continued)

*Primary Examiner* — Nicholas Corbo
(74) *Attorney, Agent, or Firm* — Staas & Halsey LLP

(57) ABSTRACT

A method and system for sharing information between users while reproducing media in a media reproducing system, the method including: reproducing the media in the media reproducing system; capturing a part of the media in the media reproducing system; and registering a media related question including the captured part of the media in an information sharing server through a return channel of the media reproducing system. Accordingly, the users can share information in real time by generating the media related question by directly capturing the media in the media reproducing system, registering the media related question in the information sharing server, and displaying on the media reproducing system of another user that such media related question is registered. Also, since a question can be directly registered while reproducing the media, information can be conveniently shared without interrupting the media reproduction.

19 Claims, 4 Drawing Sheets

(56) References Cited

U.S. PATENT DOCUMENTS

| | | | |
|---|---|---|---|
| 2002/0069415 A1* | 6/2002 | Humbard et al. | 725/52 |
| 2003/0074671 A1* | 4/2003 | Murakami et al. | 725/109 |
| 2004/0098754 A1* | 5/2004 | Vella et al. | 725/135 |
| 2005/0229227 A1* | 10/2005 | Rogers | 725/115 |
| 2008/0163301 A1* | 7/2008 | Park | G08C 17/00 725/46 |
| 2009/0077034 A1 | 3/2009 | Kim et al. | |
| 2009/0083815 A1* | 3/2009 | McMaster et al. | 725/110 |

FOREIGN PATENT DOCUMENTS

| | | |
|---|---|---|
| KR | 10-0867005 | 10/2008 |
| KR | 10-2009-0073944 A | 7/2009 |
| WO | WO 0004726 A2 * | 1/2000 |

OTHER PUBLICATIONS

Korean Notice of Allowance issued Dec. 18, 2012 in corresponding Korean Patent Application 10-2008-0009003.

* cited by examiner

METHOD AND SYSTEM FOR SHARING INFORMATION BETWEEN USERS IN MEDIA REPRODUCING SYSTEM

CROSS-REFERENCE TO RELATED APPLICATION

This application claims the benefit of Korean Patent Application No. 2008-9003, filed Jan. 29, 2008 in the Korean Intellectual Property Office, the disclosure of which is incorporated herein by reference.

BACKGROUND OF THE INVENTION

1. Field of the Invention

Aspects of the present invention relate to sharing information between users in a media reproducing system of digital broadcasting, and more particularly, to a method and system to provide information in a media reproducing system including a bidirectional channel, wherein a user registers a question in a server by generating the question using a media capture, and another user solves the requested question.

2. Description of the Related Art

Unlike analog broadcasting, digital broadcasting (such as digital television (DTV) and internet protocol television (IPTV)) provides information related to a current TV program in addition to an image (such as video data). However, the user is not provided with whole data, but unilaterally receives information selected by a content provider. In other words, the user is not entirely provided with desired information.

When the desired information is not provided, the user may obtain the desired information via a search engine or a web site of the corresponding broadcasting company. However, finding desired information is difficult as a text based search is performed in order to search for the information. Accordingly, instead of using a keyword, a method of capturing the media (such as an image or audio of a video broadcast on a TV) and using the captured media is beneficial.

SUMMARY OF THE INVENTION

Aspects of the present invention provide a method and system of sharing information between users, by registering a media related question in an information sharing server using a media capture, and sharing information about the media related question between users. Aspects of the present invention also provide a computer readable recording medium having recorded thereon a program to execute the method above.

According to an aspect of the present invention, there is provided a method of sharing information between users while reproducing media in a media reproducing system, the method including: reproducing the media in the media reproducing system; capturing a part of the media in the media reproducing system; and registering a media related question including the captured part of the media in an information sharing server through a return channel of the media reproducing system.

The registering of the media related question may include: extracting an attribute of the captured part of the media; receiving a question of a user related to the captured part of the media; and registering the extracted attribute and the question of a user in the information sharing server.

The attribute may be a content ID of the captured part of the media, a frame time of a frame including the captured part of the media, and an object ID included in the captured part of the media.

The method may further include displaying, on the media reproducing system, a message notifying that information about the media related question is registered in the information sharing server.

The media reproducing system may be a digital television (DTV), an internet protocol TV (IPTV), digital multimedia broadcasting (DMB), and/or personal broadcasting.

According to another aspect of the present invention, there is provided a method of sharing information between users while reproducing media in a media reproducing system, the method including: reproducing the media in the media reproducing system; displaying a message notifying that a user has registered a question in an information sharing server on the media reproducing system; displaying the question on the media reproducing system; receiving information related to the question from another user; and registering the received information on the information sharing server through a return channel of the media reproducing system.

According to another aspect of the present invention, there is provided a media reproducing system having a bidirectional data channel including a service channel to receive media from a media server and a return channel to transmit information to the media server, the media reproducing system including: a media reproducer to reproduce the media received from the media server on a display; a user manipulator to receive a media related command from a user; a media capturer to capture a part of the media according to a media capture command from the user manipulator; a question generator to generate a media related question including the captured media; an information registerer to register the media related question in an information sharing server via the return channel; and a message displayer to display, on the display, a message notifying that information about the media related question is registered in the information sharing server.

The question generator may extract an attribute of the captured part of the media, receive a question of a user inputted by the user from the user manipulator, and generate the media related question by combining the extracted attribute and the question of the user.

The attribute extracted by the question generator may be a content ID of the captured part of the media, a frame time of a frame including the captured part of the media, and an object ID included in the captured part of the media.

The media reproducing system may further include an information inputter to display, on the display, a media related question registered in the information sharing server by another user according to a question display command from the user manipulator, and to receive information about the media related question from the user, wherein the message displayer may display, on the display, a message notifying that the other user has registered the media related question on the information sharing server, and the information registerer may register the information received from the user on the information sharing server via the return channel.

The media reproducing system may be a DTV, an IPTV, DMB, and/or personal broadcasting.

According to yet another aspect of the present invention, there is provided a media information sharing system to share information on media between users, the system including: a media provider to transmit the media; a first media reproducing system to receive the media transmitted by the media provider through a service channel, the first media reproducing system including: a media reproducer to reproduce the media received from the media provider on a first display; a user manipulator to receive a media related command from a first user, a media capturer to capture a part of the media according to a media capture command from the user manipulator, a question generator to generate a media related question including the captured part of the media, and an information registerer to transmit the media related question via a first return channel; an information sharer to receive and to register the media related question; and a second media reproducing system including: an information inputter to display, on a second display, the media related question registered in the information sharer, a user manipulator to receive information related to the question from a second user, and an information registerer to register the information on the information sharer via a second return channel.

The information sharer and the media provider may be provided in a same server.

According to still another aspect of the present invention, there is provided a method of sharing information between users while reproducing media in a media reproducing system, the method including: reproducing the media in the media reproducing system; and transmitting a media related question including the captured part of the media to an information sharing server through a return channel of the media reproducing system.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
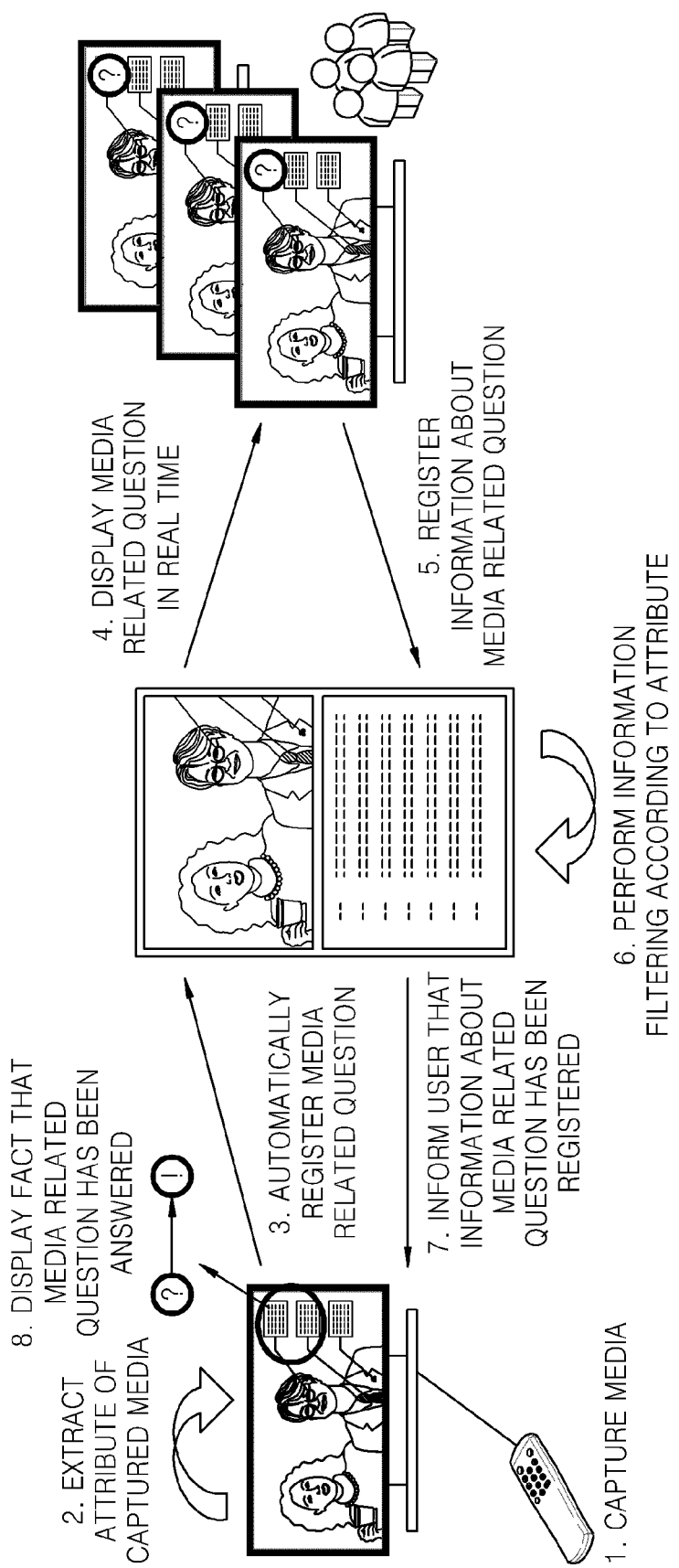
FIG. 1 is a diagram illustrating a method of sharing information according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide a method of using a media capture (such as an image or audio of a TV) instead of a keyword using a simple text. Aspects of the present invention also provide a method of sharing information on an interest of a user (i.e., a question) regarding the media capture with another user by using the media capture as a tag, instead of unilaterally transmitting information from a content provider to the user.

In the digital broadcasting age, in addition to an image, information about a current TV program can be provided in a metadata form. Accordingly, a bidirectional operation has been added to digital broadcasting and, thus, an interactive multimedia service can be provided.

Examples of a data service provided by the digital broadcasting include: an electronic program guide (EPG) service or a service of providing current program related information (such as characters in a drama, background music, shooting locations, details of a documentary, and explanations of terms) as a program related service; an interactive service using a bidirectional channel called a service channel and a return channel; and an internet connection service.

When a user has an additional question apart from information provided by a conventional program related service, the user searches for an answer to the additional question by, for example, searching the Internet using a search engine or the corresponding broadcasting company web site (hereinafter, referred to as an information sharing server) by using a keyword. Here, since the search is based on a text instead of a moving image or audio, a satisfactory answer may be difficult to find. However, while another user viewing the current TV program may know the answer to the question, the users cannot easily share such information in real time according to conventional technologies.

FIG. 1 is a diagram illustrating a method of sharing information according to an embodiment of the present invention. Referring to FIG. 1, a media reproducing system receives an image signal and additional information from a media server (such as a broadcasting company), and reproduces the image signal for a user. While reproducing the media, the user may have a question apart from the information received from a content provider (i.e., the media server).

When the user wants to ask a question about the media, the user captures a desired part of the media (such as a static image, a moving image, or audio) in operation 1. Here, a user manipulator, which receives a media capture command from the user, may be a remote controller as illustrated in FIG. 1. However, it is understood that aspects of the present invention are not limited thereto. For example, when the media is reproduced in a computer, the user manipulator may be a keyboard of the computer. Alternatively, the media capture command may be transmitted through a voice recognition device, by connecting the voice recognition device to the media reproducing system.

After capturing the media, an attribute is extracted from the captured media in operation 2. Examples of the attribute include a content ID of the media, a frame time of a frame including the capture frame, and an object ID included in the captured media. One or more of the above examples of the attribute and/or a different attribute may be extracted. Examples of an object corresponding to the object ID include a thing, a person, and a background picture in image content. For example, glasses or a necklace of a person on a screen may be an object, and each object is assigned with an object ID. The object ID is pre-assigned by the content provider. Furthermore, if an object that does not have an object ID is selected, the user may generate the object ID and register related information in a server.

In operation 3, a media related question including the captured media is generated, and the generated media related question is registered in an information sharing server via a return channel of the media reproducing system. The media related question may include only the captured media or the captured media and a question of the user related to the captured media. When the media related question includes the question of the user, the question of the user is received via the user manipulator (such as a remote controller, a keyboard, a voice recognition device, etc.), and both the question of the user and the attribute of the captured media are transmitted to the information sharing server. Here, the media reproducing system may display that the media related question is registered in the information sharing server by using a predetermined indication, such as "?".

When the question of the user is registered in the information sharing server, a media reproducing system of another user displays the media related question by using the predetermined indication in real time in operation 4.

When the media reproducing system displays the media related question, the other user inputs information about the media related question in operation 5. Here, the information is inputted by a user manipulator (such as a remote controller, a keyboard, a voice recognition device, etc.). The inputted information is registered in the information sharing server through the return channel.

The information sharing server performs an information filtering on the inputted media related question and the information about the media related question according to the attribute of the captured media in operation 6. The information filtering arranges the information according to the attribute for convenience of the search. Accordingly, the captured media may be tagged. For example, the user may select an earring in the captured image as an object, and may register a question, "Where would I be able to buy this earring?" with an object ID of the earring. In this case, such a question is registered with tags (such as the object ID of the earring, "earring," and "buy"), and the question can be easily arranged and searched for by these tags. For example, when another user clicks the earring with a mouse, questions about the earring are displayed.

The information sharing server informs the user who registered the media related question through the media reproducing system that the other user registered the information about the media related question in operation 7. Moreover, the fact that the media related question has been answered is displayed on the media reproducing system of the user in operation 8. For example, the predetermined indication "?" is changed to "!", as illustrated in FIG. 1, so that the user knows that the other user registered the information. It is understood that the indications are not limited to "?" and "!". For example, "X" and "O" may be used, or a number corresponding to a number of responses registered by other users may be used.

Figure 2:
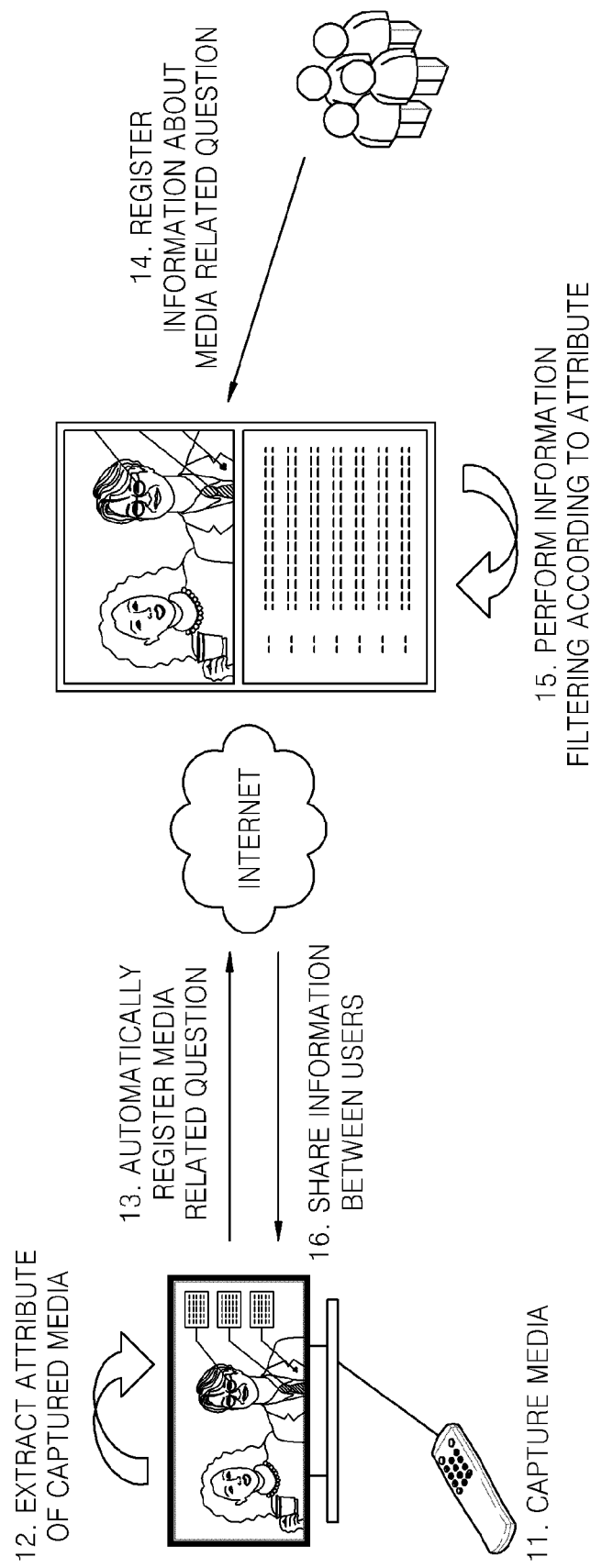
FIG. 2 is a diagram illustrating a method of sharing information according to another embodiment of the present invention.

FIG. 2 is a diagram illustrating a method of sharing information according to another embodiment of the present invention. Referring to FIG. 2, operations 11, 12, 13, and 15 are similar to operations 1, 2, 3, and 6, respectively, of FIG. 1, and detailed descriptions thereof will be omitted herein.

In FIG. 2, the other user directly accesses the information sharing server so as to input the information about the registered media related question in operation 14. Accordingly, users other than those users reproducing the media by using a media reproducing system can share information about the media related question. As above, the information about the media related question can be shared between the user reproducing the media and other users in real time in operation 16.

Figure 3:
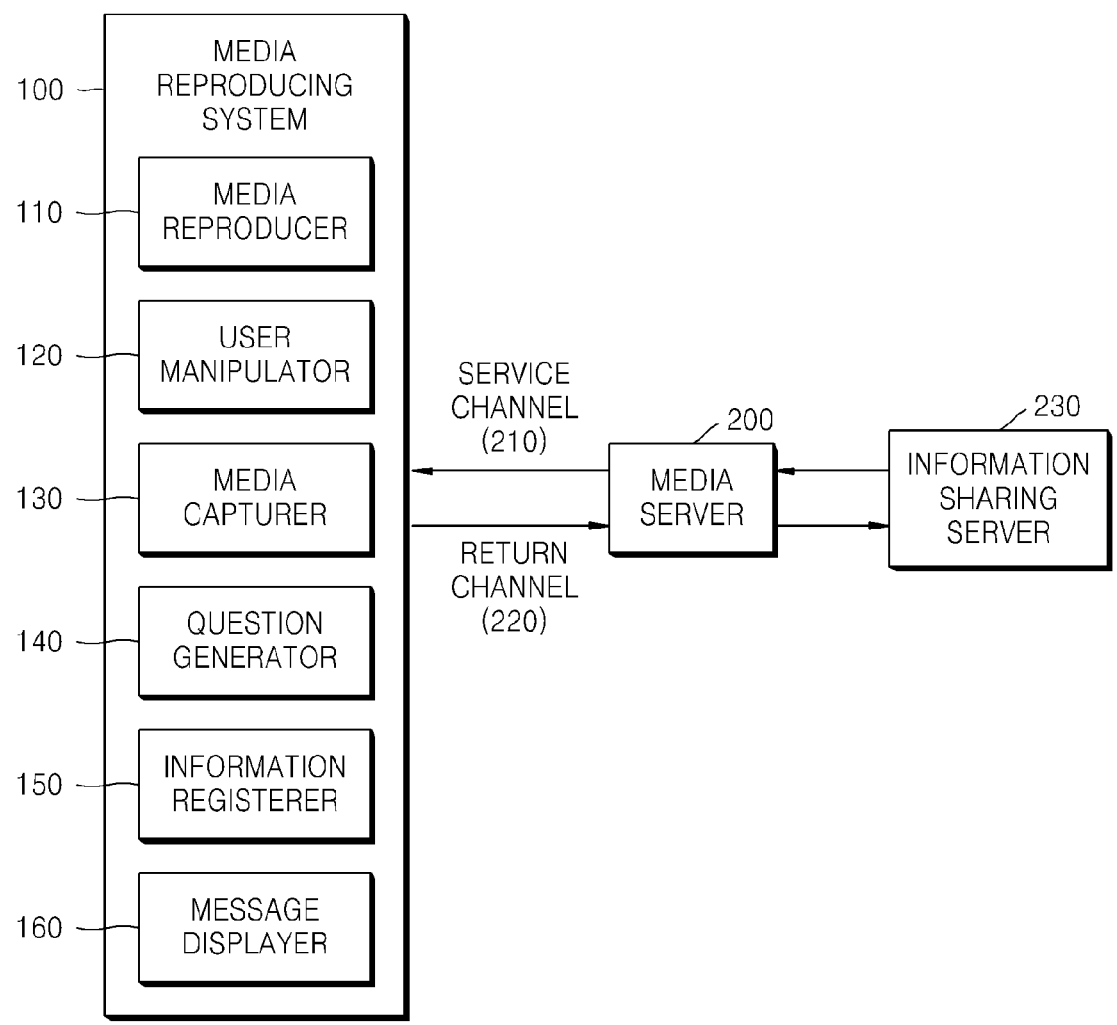
FIG. 3 is a block diagram illustrating a media reproducing system according to an embodiment of the present invention.

FIG. 3 is a block diagram illustrating a media reproducing system 100 according to an embodiment of the present invention. The media reproducing system 100 uses a service channel 210 to receive the media from a media server 200 (for example, a server of a content provider), and a return channel 220 to transmit information to the media server 200. Non-limiting examples of the media reproducing system 100 include a digital TV (DTV), an internet protocol TV (IPTV), digital multimedia broadcasting (DMB), and personal broadcasting (such as user created content (UCC)). When the media reproducing system 100 is a UCC reproducing system, a server providing UCC content is the media server 200, and a computer reproducing UCC is the media reproducing system 100.

Referring to FIG. 3, the media reproducing system 100 includes a media reproducer 110, a user manipulator 120, a media capturer 130, a question generator 140, an information registerer 150, and a message displayer 160. For convenience of description, the media server 200 and an information sharing server 230 are also illustrated in FIG. 3. In FIG. 3, the media server 200 and the information sharing server 230 are illustrated as separate servers, but it is understood that the servers 200 and 230 may be one apparatus.

The media reproducing system 100 uses the service channel 210 to receive the media from the media server 200, and the return channel 220 to provide information to the media server. The media reproducer 110 displays the media received from the media server 200 in a display.

The user manipulator 120 receives a media related command from a user. Also, the user manipulator 120 receives a media related question from the user. As described above, examples of the user manipulator 120 include a remote controller, a keyboard, a voice recognition device, etc. The media capturer 130 captures a part of the reproduced media. Specifically, the media capturer 130 captures the media upon receiving a media capture command from the user manipulator 120.

The question generator 140 generates the media related question including the captured media. If the media related question includes only the captured media, the media related question is generated by extracting an attribute from the captured media. Examples of the attribute includes a content ID of the media, a frame time of a frame including the captured media, an object ID included in the captured media, etc.

If the media related question also includes a question of the user, the user manipulator 120 further receives the question of the user, and transmits the question of the user to the question generator 140. The question generator 140 then generates the media related question by combining the extracted attribute and the question of the user.

The information registerer 150 transmits the media related question to the media server 200 via the return channel 220, and the media server 200 registers the media related question on the information sharing server 230. If the media server 200 and the information sharing server 230 are in one apparatus, the media related question can be directly registered in the information sharing server 230 via the return channel 220.

When another user registers information about the media related question in the information sharing server 230, the message displayer 160 displays a message about the information on a display.

Figure 4:
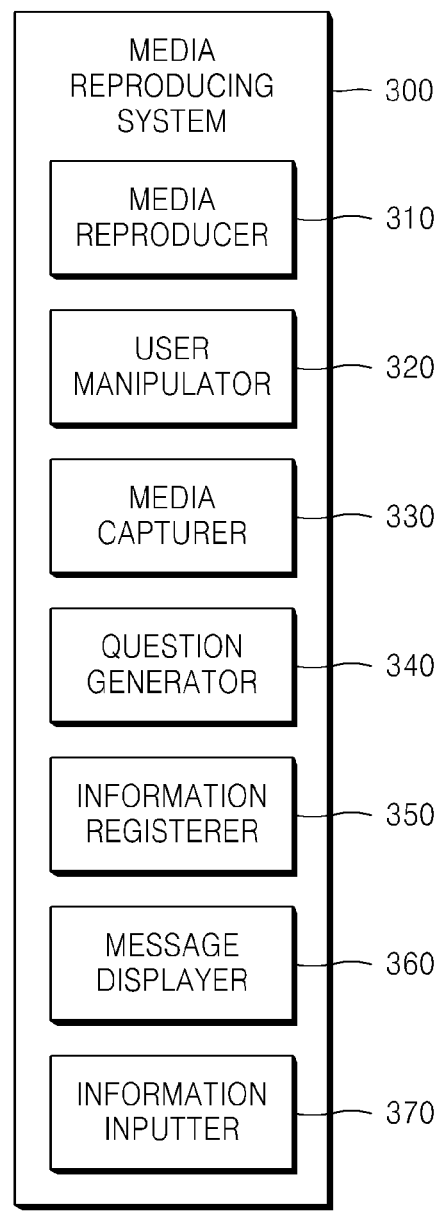
FIG. 4 is a block diagram illustrating a media reproducing system according to another embodiment of the present invention.

FIG. 4 is a block diagram illustrating a media reproducing system 300 according to another embodiment of the present invention. Referring to FIG. 4, the media reproducing system 300 includes a media reproducer 310, a user manipulator 320, a media capturer 330, a question generator 340, an information registerer 350, a message displayer 360, and an information inputter 370.

The media reproducing system 300 is a system used by the user who inputs the information about the media related question in FIG. 1. The media reproducer 310, the user manipulator 320, the media capturer 330, and the question generator 340 of FIG. 4 respectively have similar operations to the media reproducer 110, the user manipulator 120, the media capturer 130, and the question generator 140 of FIG. 3, and detailed descriptions thereof will be omitted herein.

The message displayer 360 displays a message notifying the user that another user (for example, the user of the media reproducing system 100 of FIG. 3) registered the media related question in the information sharing server 230 of FIG. 3. Accordingly, the user may input a question display command for displaying the media related question via the user manipulator 320.

According to the question display command from the user manipulator 320, the information inputter 370 displays the media related question registered in the information sharing server 230 of FIG. 3, and receives the information about the media related question form the user. The information registerer 350 registers the information on the information sharing server 230 through the return channel 220 of FIG. 3.

In a conventional media reproducing system, a user can only obtain information unilaterally provided by a content provider, and a question not addressed by the information is separately registered in a search engine so as to share information with other users. In this case, only a text based search is provided, and thus it is difficult to share information between users. Also, the question is registered separately from media reproduction, and thus the user is inconvenienced since the media reproduction may be stopped so as to register the question.

However, according to aspects of the present invention, information can be shared between users in real time by directly capturing the media from a media reproducing system, generating a media related question based on the captured media, registering the media related question in an information sharing server, and displaying a message about the registration of the media related question on a media reproducing system of another user. Also, the question can be directly registered while reproducing the media, and thus the information can be conveniently shared without interrupting the media reproduction.

Aspects of the present invention can also be embodied as computer (including all devices having an information processing operation) readable codes on a computer readable recording medium. A computer includes all devices performing an information processing function by executing a program, and specifically includes a media reproducing system according to aspects of the present invention. The computer readable recording medium is any data storage device that can store data that can be thereafter read by a computer system. Examples of the computer readable recording medium include read-only memory (ROM), random-access memory (RAM), CD-ROMs, DVDs, magnetic tapes, floppy disks, hard disks, and optical data storage devices. Specifically, when a media providing server transmits a program for executing the method of the present invention to a computer, a medium (such as a memory or a disk) that stores the program corresponds to the recording medium according to aspects of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of sharing information between users while reproducing media in a media reproducing device, the method comprising:
   reproducing the media in the media reproducing device;
   receiving a captured part of the media in the media reproducing device, wherein the captured part of the media corresponds to an object in a frame of the reproduced media;
   extracting an attribute of the captured part of the media;
   transmitting the attribute and a question related to the captured part of the media to an information sharing server,
   wherein the information about the question is filtered, by the information sharing server, according to an object ID included in the question, the object ID corresponding to the object in the frame which is included in the captured part of the media;
   displaying a question mark, informing the users about the question, on the captured part of the media;
   replacing the question mark with an exclamation point informing the users about a response to the question when the response is received from the information sharing server;
   displaying the exclamation point on the captured part of the media; and
   displaying a pop-up indicating information about the question when the captured part of the media is selected.

2. The method as claimed in claim 1, wherein the transmitting of the question comprises registering the question including the captured part of the media in the information sharing server.

3. The method as claimed in claim 1, wherein the transmitting of the question comprises:
   receiving the question, related to the captured part of the media, from a user of the media reproducing device; and
   registering the extracted attribute and the question of the user in the information sharing server.

4. The method as claimed in claim 1, wherein the attribute further includes a content ID of the captured part of the media, a frame time of a frame including the captured part of the media, and the object ID corresponding to the captured part of the media.

5. The method as claimed in claim 1, further comprising displaying, on the media reproducing device, a message notifying that information about the question is registered in the information sharing server.

6. The method as claimed in claim 1, further comprising:
   displaying, on the media reproducing device, a first message notifying that the question is registered in the information sharing server; and
   displaying, on the media reproducing device, a second message notifying that information about the question is registered in the information sharing server.

7. The method as claimed in claim 1, wherein the media reproducing device is a digital television (DTV), an internet protocol TV (IPTV), digital multimedia broadcasting (DMB) device, and/or personal broadcasting device.

8. A method of sharing information between users while reproducing media in a media reproducing device, the method comprising:
   reproducing the media in the media reproducing device;

displaying a question mark on an object in a frame of the reproduced media when a question related to a capture of the media is registered in an information sharing server connected to the media reproducing device, wherein a captured part of the media corresponds to the object in the frame of the reproduced media;

displaying the question on the media reproducing device when the question mark is selected;

replacing the question mark with an exclamation point informing the users about a response to the question when the response has been registered;

displaying the exclamation point on the object in the frame of the reproduced media; and displaying a pop-up indicating the information which is related to the question when the capture of the media is selected;

wherein the information about the question is filtered, by the information sharing server, according to an object ID included in the question, the object ID corresponding to the object in the frame.

9. The method as claimed in claim 8, wherein the transmitting of the information related to the question comprises registering the information in the information sharing server.

10. A media reproducing device having a bidirectional data channel comprising a service channel to receive media from a media server and a return channel to transmit information to the media server, the media reproducing device comprising:

a media reproducer to reproduce the media received from the media server on a display;

a user manipulator to receive a command related to the media from a user;

a media capturer to capture a part of the media according to a media capture command from the user manipulator, the captured part of the media corresponding to an object in a frame of the reproduced media;

a question generator to extract an attribute of the captured part of the media and generate a question related to the captured part of the media;

an information registerer to register the question in an information sharing server via the return channel, and a message displayer to display, on the display, a question mark, informing the users about the question, on the captured part of the media wherein the media reproducer to replace the question mark with an exclamation point informing the users about a response to the question when the response is received from the information sharing server wherein the message displayer to display the exclamation point on the captured part of the media and to display a pop-up indicating an information about the question when the captured part of the media is selected, and wherein the information about the question is filtered, by the information sharing server, according to an object ID included in the question, the object ID corresponding to the object in the frame which is included in the captured part of the media.

11. The media reproducing device as claimed in claim 10, wherein the message displayer to display, on the display, a message notifying that the information about the question is registered in the information sharing server.

12. The media reproducing device as claimed in claim 10, wherein the question generator, receives the question from the user through the user manipulator, and generates the question by combining the extracted attribute and the question of the user.

13. The media reproducing device as claimed in claim 10, wherein the attribute extracted by the question generator further includes a content ID of the captured part of the media, a frame time of a frame including the captured part of the media, and the object ID associated with the captured part of the media.

14. The media reproducing device as claimed in claim 10, further comprising an information inputter to display, on the display, another question registered in the information sharing server by another user, and to receive information about the other question from the user, wherein the information registerer registers the information received from the user while reproducing the media on the information sharing server via the return channel.

15. The media reproducing device as claimed in claim 14, further comprising the message displayer to display, on the display, a message notifying that the another user registered the question on the information sharing server.

16. The media reproducing device as claimed in claim 10, wherein the media reproducing device is a digital television (DTV), an internet protocol TV (IPTV), digital multimedia broadcasting (DMB), and/or personal broadcasting.

17. A media reproducing device having a bidirectional data channel comprising a service channel to receive media from a media server and a return channel to transmit information to the media server, the media reproducing device comprising:

a media reproducer to reproduce the media received from the media server;

a display to display the reproduced media;

an information inputter to display, on the display, a question, including an extracted attribute of a part of the media captured by a user and the captured part of the media, registered in an information sharing server, the captured part of the media corresponding to an object in a frame of the reproduced media;

a user manipulator to receive information related to the question from the user;

an information registerer to register the information on the information sharing server via the return channel; and a message displayer to display a question mark on the object in a frame of the reproduced media when related to a capture of the media is registered in an information sharing server connected to the media reproducing device, the captured part of the media corresponds to the object in a frame of the reproduced media, and to display the question on the media reproducing device when the question mark is selected;

wherein the media reproducer replaces the question mark with an exclamation point informing the users about a response to the question when the response has been registered, wherein the message displayer displays the exclamation point on the object in the frame of the reproduced media and displays a pop-up indicating the information related to the question when the capture of the media is selected, and wherein the information about the question from the user is filtered, by the information sharing server, according to an object ID included in the question, the object ID corresponding to the object in the frame which is included in the captured part of the media.

18. A non-transitory computer readable recording medium having recorded thereon a program to execute a method of sharing information between users while reproducing media in a media reproducing device, the method comprising:

reproducing the media in the media reproducing device;
receiving a captured part of the media in the media reproducing device, wherein the captured part of the media corresponds to an object in a frame of the reproduced media;
extracting an attribute of the captured part of the media;
transmitting the attribute and a question related to the captured part of the media to an information sharing server; and
displaying a question mark, informing the users about the question, on the captured part of the media;
replacing the question mark with an exclamation point informing the users about a response to the question when the response is received from the information sharing server;
displaying the exclamation point on the captured part of the media; and
displaying a pop-up indicating information about the question when the captured part of the media is selected,
wherein the information about the question is filtered, by the information sharing server, according to an object ID included in the question, the object ID corresponding to the object in the frame which is included in the captured part of the media.

19. A non-transitory computer readable recording medium having recorded thereon a program to execute a method of sharing information between users while reproducing media in a media reproducing device, the method comprising:
reproducing the media in the media reproducing device;
displaying a question mark on an object in a frame of the reproduced media when a question related to a capture of the media is registered in an information sharing server connected to the media reproducing device, wherein a captured part of the media corresponds to the object in a frame of the reproduced media;
displaying the question on the media reproducing device when the question mark is selected;
replacing the question mark with an exclamation point informing the users about a response to the question when the response has been registered;
displaying the exclamation point on the object in the frame of the reproduced media; and
displaying a pop-up indicating the information related to the question when the capture of the media is selected,
wherein the information about the question is filtered, by the information sharing server, according to an object ID included in the question, the object ID corresponding to the object in the frame which is included in the captured part of the media.

* * * * *